US012752955B2

(12) United States Patent
Usami

(10) Patent No.: US 12,752,955 B2
(45) Date of Patent: Oct. 6, 2026

(54) RESIN-MADE CONTAINER, RESIN-MADE CONTAINER MANUFACTURING METHOD, RESIN-MADE CONTAINER MANUFACTURING APPARATUS, AND MOLD

(71) Applicant: NISSEI ASB MACHINE CO., LTD., Nagano (JP)

(72) Inventor: Masayuki Usami, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 70 days.

(21) Appl. No.: 18/606,540

(22) Filed: Mar. 15, 2024

(65) Prior Publication Data

US 2024/0308720 A1    Sep. 19, 2024

Related U.S. Application Data

(63) Continuation of application No. 17/415,120, filed as application No. PCT/JP2019/049922 on Dec. 19, 2019, now Pat. No. 11,964,793.

(30) Foreign Application Priority Data

Dec. 20, 2018 (JP) ................................ 2018-238111

(51) Int. Cl.
*B29C 64/00* (2017.01)
*B29C 49/12* (2006.01)
(Continued)

(52) U.S. Cl.
CPC ........... *B65D 1/0276* (2013.01); *B29C 49/12* (2013.01); *B29C 2049/4881* (2022.05);
(Continued)

(58) Field of Classification Search
CPC ..................................................... B29C 49/12
See application file for complete search history.

(56) References Cited

U.S. PATENT DOCUMENTS 3,319,291 A 5/1967 Schaich
3,408,692 A 11/1968 Schaich
(Continued)

FOREIGN PATENT DOCUMENTS

CN 110076982 8/2019
FR 3 058 084 A1 5/2018
(Continued)

OTHER PUBLICATIONS

International Search Report issued in International Patent Application No. PCT/JP2019/049922, dated Mar. 3, 2020, along with an English translation thereof.
(Continued)

*Primary Examiner* — Nicholas Krasnow
(74) *Attorney, Agent, or Firm* — Greenblum & Bernstein, P.L.C.

(57) ABSTRACT

This resin-made container is provided with: a neck portion having a content inlet-outlet portion; a lateral surface portion connected to the neck portion; and a bottom portion that is disposed on the side opposite to the neck portion and that is connected to the lateral surface portion. The resin-made container is produced by a stretch blow molding process. The bottom portion has formed therein a bulge section that protrudes downward in the vertical direction. The bulge section is disposed in an eccentric region, of the bottom portion, positioned outside a region demarcated by perpendicularly projecting an opening plane of the inlet-outlet portion of the neck portion.

2 Claims, 13 Drawing Sheets

(51) Int. Cl.
*B65D 1/02* (2006.01)
*B29C 49/48* (2006.01)
*B29L 31/00* (2006.01)

(52) U.S. Cl.
CPC ............... *B29C 2049/48825* (2022.05); *B29C 2949/0799* (2022.05); *B29L 2031/7158* (2013.01)

(56) References Cited

U.S. PATENT DOCUMENTS

| | | | | |
|---|---|---|---|---|
| D324,495 | S * | 3/1992 | Warrington | D9/528 |
| 5,178,817 | A | 1/1993 | Yamada et al. | |
| 7,033,535 | B1 * | 4/2006 | Limanjaya | B29C 49/4242 264/534 |
| 7,150,371 | B1 | 12/2006 | Larson et al. | |
| 2011/0256331 | A1 | 10/2011 | Codd et al. | |
| 2011/0303673 | A1 | 12/2011 | Wilkes | |
| 2013/0153576 | A1 | 6/2013 | Wilkes | |
| 2013/0183470 | A1 | 7/2013 | Codd et al. | |
| 2018/0208715 | A1 | 7/2018 | Codd et al. | |

FOREIGN PATENT DOCUMENTS

| | | | |
|---|---|---|---|
| JP | 56-127430 | A | 10/1981 |
| JP | 2-70420 | | 3/1990 |
| JP | 02-086424 | A | 3/1990 |
| JP | 5-305934 | | 11/1993 |
| JP | 8-164557 | A | 6/1996 |
| JP | 8-207128 | A | 8/1996 |
| JP | 08-309840 | A | 11/1996 |
| JP | 2003-40233 | A | 2/2003 |
| JP | 2003-181907 | A | 7/2003 |
| JP | 2003-523289 | A | 8/2003 |
| JP | 2004-59129 | A | 2/2004 |
| JP | 2004-122636 | A | 4/2004 |
| JP | 2005-007786 | A | 1/2005 |
| JP | 2006-62110 | A | 3/2006 |
| JP | 2009-241429 | A | 10/2009 |
| JP | 2012-6317 | A | 1/2012 |
| JP | 2013-523995 | | 6/2013 |
| JP | 2013-529561 | A | 7/2013 |
| JP | 2016-30428 | A | 3/2016 |
| WO | 2016/017059 | A1 | 2/2016 |

OTHER PUBLICATIONS

Written Opinion of the International Searching Authority issued in International Application No. PCT/JP2019/049922, dated Mar. 3, 2020, along with an English translation thereof.
Partial Supplementary European Search Report issued in European Patent Application No. 19901205.5 on Jun. 30, 2022.
Office Action issued in Chinese Patent Application No. 201980092049.5 dated Aug. 22, 2022, along with English translation thereof.
Extended European Search Report issued in European Patent Application No. 19901205.5 dated Oct. 7, 2022.
Office Action issued in Corresponding JP Patent Application No. 2020-561520, dated Dec. 12, 2023, along with an English translation thereof.

* cited by examiner

RESIN-MADE CONTAINER, RESIN-MADE CONTAINER MANUFACTURING METHOD, RESIN-MADE CONTAINER MANUFACTURING APPARATUS, AND MOLD

CROSS-REFERENCE TO RELATED APPLICATIONS

This is a continuation of U.S. patent application Ser. No. 17/415,120, filed Jun. 17, 2021, which is a National Phase application of International Application No. PCT/JP2019/049922, filed Dec. 19, 2019, which claims the benefit of priority to Japanese Application No. 2018-238111 filed Dec. 20, 2018. The disclosure of each of the above-mentioned documents, including the specification, drawings, and claims, is incorporated herein by reference in its entirety.

TECHNICAL FIELD

The present disclosure relates to a resin-made container, a resin-made container manufacturing method, a resin-made container manufacturing apparatus, and a mold.

BACKGROUND ART

PTL 1 to PTL 5 disclose a method of manufacturing an eccentric container or a container with a bent neck by using a stretch blow molding method. For example, PTL 4 discloses a synthetic resin bottle-type container having at least two axis centers in which an opening center of a mouth portion and a bottom surface center of a bottom portion are made to be eccentric to each other by a biaxial stretch blow molding method. PTL 5 discloses a blow-molded container in which a central axis of a body portion is made to be eccentric with respect to a central axis of a mouth portion by a blow molding method using a liquid pressure as a pressurizing medium. PTL 6 discloses a method of manufacturing a bent container in which central axes of a neck portion and a bottom portion are different from each other by an extrusion blow molding method. PTL 7 discloses a method of molding a container having a bent neck portion and formed to contain liquid detergent and the like.

CITATION LIST

Patent Literature

[PTL 1] JP-A-2006-062110
[PTL 2] JP-A-2009-241429
[PTL 3] JP-A-2003-181907
[PTL 4] JP-A-2012-006317
[PTL 5] JP-A-2003-040233
[PTL 6] WO2016/017059
[PTL 7] JP-A-H08-207128

SUMMARY OF INVENTION

Technical Problem

As described above, there is an eccentric container (off-center bottle) in which a central axis of a neck portion is not coaxial with a central axis of a body portion. Examples of a method of manufacturing such an eccentric container include a manufacturing method using an extrusion blow molding method and a manufacturing method using a stretch blow molding method. In the related art, according to the manufacturing method using a stretch blow molding method, it is not possible to manufacture a container having a large eccentricity (a degree that a central axis of the neck portion of the container is eccentric with respect to a central axis of the body portion or bottom portion of the container). On the other hand, a container that can be manufactured by the extrusion blow molding method is inferior to the container manufactured by the stretch blow molding method in terms of aesthetic appearance, dimension accuracy and the like, although the eccentricity thereof can be made larger. In addition, according to the extrusion blow molding method, it is necessary to perform post processes such as cutting of burrs that remain on the container even after the blow molding, and trimming of a cut surface. Further, a large amount of resin is wasted (discarded). Under such situations, in recent years, there is an increasing desire to manufacture a container having a large eccentricity by using the stretch blow molding method.

An object of the present disclosure is to provide a resin-made container having a large eccentricity that can be manufactured using a stretch blow molding method, a resin-made container manufacturing method, a resin-made container manufacturing apparatus, and a mold.

Solution to Problem

A resin-made container according to an aspect of the present disclosure capable of achieving the above object is manufactured by a stretch blow molding method, the resin-made container including:

a neck portion having an inlet-outlet portion for contents;

a lateral surface portion connected to the neck portion; and a bottom portion disposed on an opposite side to the neck portion and connected to the lateral surface portion, in which the bottom portion is formed with a bulge portion protruding vertically downward, and the bulge portion is positioned in an eccentric region of the bottom portion, the eccentric region being out of a region perpendicularly projected from an opening plane of the inlet-outlet portion of the neck portion.

According to the above configuration, the resin-made container includes the bulge portion protruding vertically downward. In this way, the bottom portion of the resin-made container is formed with the bulge portion, and the resin-made container is largely eccentric to such extent that the bulge portion is positioned in the eccentric region of the bottom portion, which is out of the region perpendicularly projected from the opening plane of the inlet-outlet portion of the neck portion.

In addition, a resin-made container according to an aspect of the present disclosure is manufactured by a stretch blow molding method, the resin-made container including:

a neck portion having an inlet-outlet portion for contents;

a lateral surface portion connected to the neck portion; and a bottom portion disposed on an opposite side to the neck portion and connected to the lateral surface portion, in which the bottom portion is formed with a cut remaining portion, which is left after a bulge portion protruding vertically downward is cut, and the cut remaining portion is positioned in an eccentric region of the bottom portion, the eccentric region being out of a region perpendicularly projected from an opening plane of the inlet-outlet portion of the neck portion.

The resin-made container configured as described above is largely eccentric to such extent that the cut remaining portion is positioned in the eccentric region.

A resin-made container manufacturing apparatus according to an aspect of the present disclosure includes:

a clamping mechanism provided independently of a bottom mold of a mold for blow molding, the clamping mechanism being capable of clamping a protrusion provided in a bottom portion of a preform accommodated in the mold for blow molding in a state where split molds included in the mold for blow molding are opened, the protrusion being provided independently of a gate portion;

a moving mechanism configured to move the clamping mechanism such that, in a state where a neck portion of the preform is held, the protrusion is positioned in an outer region of the bottom portion, the outer region being out of a region perpendicularly projected from an opening plane of an inlet-outlet portion of the neck portion; and a stretch mechanism configured to stretch the preform by a pressurizing medium after the split molds are closed.

According to the above configuration, after the clamping mechanism clamps the protrusion of the bottom portion of the preform, the preform is bent such that the protrusion moves to the outer region of the bottom portion, which is out of the region perpendicularly projected from the opening plane of the inlet-outlet portion of the neck portion of the preform. The preform in the bent state is stretch-blown, so that a resin-made container having a large eccentricity can be manufactured.

A resin-made container manufacturing method according to an aspect of the present disclosure includes:

a clamping process of clamping a protrusion provided in a bottom portion of a preform accommodated in a mold for blow molding by a clamping mechanism in a state where split molds included in the mold for blow molding are opened, the protrusion being provided independently of a gate portion, the clamping mechanism being provided independently of a bottom mold included in the mold for blow molding;

a bending process of bending the preform by moving the protrusion to an outer region of the bottom portion in a state where a neck portion of the preform is held, the outer region being out of a region perpendicularly projected from an opening plane of an inlet-outlet portion of the neck portion; and a blow process of closing the split molds to stretch the preform by a pressurizing medium.

According to the manufacturing method configured as described above, after the clamping mechanism clamps the protrusion of the bottom portion of the preform, the preform is bent so that the protrusion moves to the outer region of the bottom portion, which is out of the region perpendicularly projected from the opening plane of the inlet-outlet portion of the neck portion of the preform. The preform in the bent state is stretch-blown, so that a resin-made container having a large eccentricity can be manufactured.

A mold according to an aspect of the present disclosure is a mold for blow molding including a bottom mold, a holding mechanism, a clamping mechanism, and a moving mechanism, in which the holding mechanism is capable of holding a neck portion of a preform, the clamping mechanism is provided independently of the bottom mold and is capable of clamping a protrusion provided in a bottom portion of the preform, the protrusion being provided independently of a gate portion, and the moving mechanism is configured to move the clamping mechanism and the bottom mold such that, in a state where the neck portion of the preform is held, the protrusion is positioned in an outer region of the bottom portion, the outer region being out of a region perpendicularly projected from an opening plane of an inlet-outlet portion of the neck portion.

According to the above configuration, after the clamping mechanism clamps the protrusion of the bottom portion of the preform, the preform is bent such that the protrusion moves to the outer region of the bottom portion, which is out of the region perpendicularly projected from the opening plane of the inlet-outlet portion of the neck portion. The preform in the bent state is stretch-blown, so that a resin-made container having a large eccentricity can be manufactured.

Advantageous Effects of Invention

According to the present disclosure, it is possible to provide the resin-made container having a large eccentricity that can be manufactured using the stretch blow molding method, the resin-made container manufacturing method, the resin-made container manufacturing apparatus, and the mold.

DESCRIPTION OF EMBODIMENTS

Figure 1A:
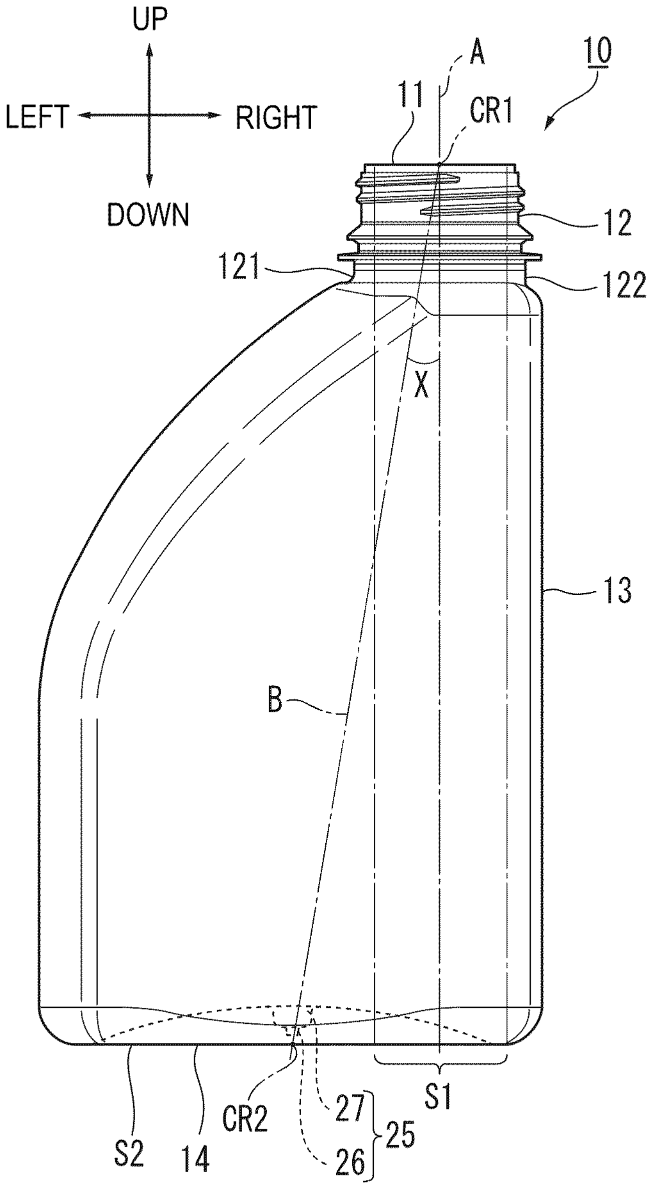
FIG. 1A is a front view of a resin-made container having a large eccentricity.

Hereinbelow, embodiments of the present disclosure will be described with reference to the drawings. Note that, the sizes of the members shown in the drawings may be different from the sizes of the actual members, for convenience of descriptions.

In descriptions of the present embodiment, for convenience of description, “the right and left direction”, “the front and rear direction”, and “the top and bottom direction” are appropriately mentioned. These directions are common to the respective drawings. These directions are denoted for convenience of description, and are not intended to be limited to the drawn directions. As used herein, “the top and bottom direction” is a direction including “the top direction” and “the bottom direction”. “The front and rear direction” is a direction including “the front direction” and “the rear direction”. “The right and left direction” is a direction including “the left direction” and “the right direction”. For example, the respective directions in FIG. 1A are directions when a container 10 is seen from the outside front in a state where the container 10 is upright. However, the definition of the directions is not limited thereto. In addition, the front and rear direction in FIG. 2 corresponds to a length direction of a blow molding apparatus 100.

Figure 1B:
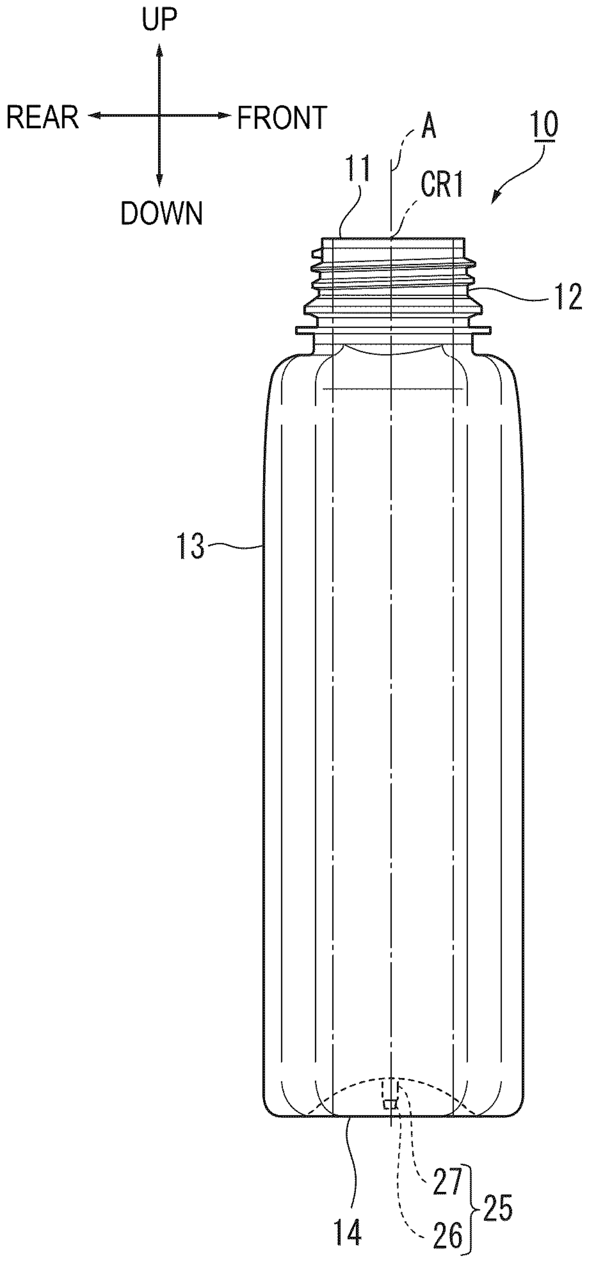
FIG. 1B is a right view of the resin-made container having a large eccentricity.
Figure 1C:
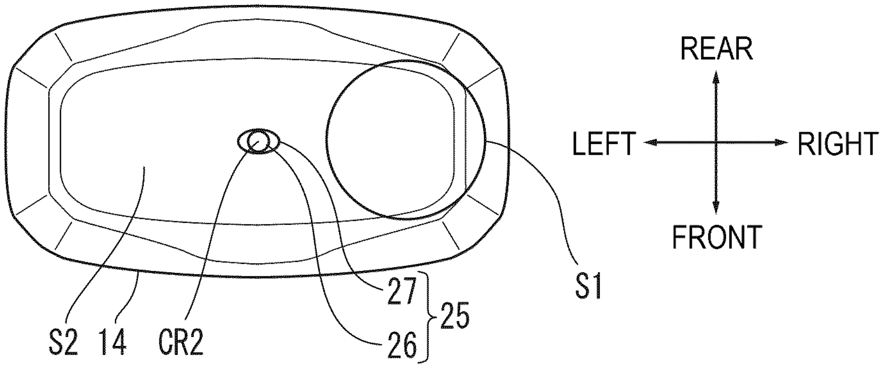
FIG. 1C is a bottom view of the resin-made container having a large eccentricity.

First, a resin-made container 10 (hereinafter, simply referred to as “container 10”) having a large eccentricity according to the present embodiment is described with reference to FIGS. 1A to 1C. FIG. 1A is a front view of a resin-made container 10 having a large eccentricity. FIG. 1B is a right view of the resin-made container 10. FIG. 1C is a bottom view of the resin-made container 10. As shown in FIG. 1A, the container 10 is a resin-made container, including a neck portion 12 having an inlet-outlet portion 11 positioned at the uppermost end, a body portion (lateral surface portion) 13 connected to the neck portion 12 and defining a sidewall portion of the container 10, and a bottom portion 14 connected to the body portion 13 and positioned at the lowest end. The inlet-outlet portion 11 has an opening plane (top plane). The bottom portion 14 is disposed on an opposite side to the neck portion 12 in the top and bottom direction. The bottom portion 14 has a bulge portion 25, which will be described later. The bulge portion 25 includes a gate portion 26 and a protrusion 27. A synthetic resin that is a material is a thermoplastic resin, and can be selected as appropriate depending on uses. Examples of the synthetic resin include PET (polyethylene terephthalate), PEN (polyethylene naphthalate), PCTA (polycyclohexylenedimethylene terephthalate), Tritan (registered trademark: copolyester available from Eastman Chemical Company), PP (polypropylene), PE (polyethylene), PC (polycarbonate), PES (polyether sulfone), PPUS (polyphenyl sulfone), PS (polystyrene), COP/COC (cyclic olefin polymer), and PMMA (polymethylmethacrylate: acrylic), PLA (polylactic acid).

In the present embodiment, a region of the bottom portion 14, which is formed when being perpendicularly projected from the opening plane of the inlet-outlet portion 11, is referred to as projected region S1. Note that, the projected region S1 is a region in which the bottom portion 14 is demarcated by two parallel lines extending downward from a lower end, as a base end, of an inner peripheral surface of the inlet-outlet portion 11, in a cross-section in the top and bottom direction. The bulge portion 25 is positioned in a region S2 that is out of the projected region S1. In the present specification, the region S2 is referred to as “eccentric region S2”. As shown in FIG. 1C, the eccentric region S2 is positioned at the substantial center and left (an outer region that is out of the projected region S1 and is positioned at the left of the projected region S1) of the bottom portion 14 of the container 10. In the container 10 of the present embodiment, the bulge portion 25 is provided at a central portion of the bottom portion 14. The central portion is a portion widening within a range of a predetermined distance (about tens of millimeters) from a central point, as a center, of the bottom portion 14, and is positioned at a substantial center of an upwardly recessed region of the bottom portion 14.

As shown in FIG. 1A, a center of an opening plane (a diameter of the inlet-outlet portion 11) of the inlet-outlet portion 11 of the neck portion 12 is denoted as a first point CR1, and an intersection point at which a vertical line hanging down through a center of the bulge portion 25 and a ground contact surface of the bottom portion 14 (a horizontal line defining an outer diameter of the lowest end of the bottom portion 14) intersect with each other is denoted as a second point CR2. A line passing through the first point CR1, orthogonal to the opening plane of the inlet-outlet portion 11 (or the ground contact surface of the bottom portion 14) and extending in the vertical direction is denoted as an axis A (first line), and a line connecting the first point CR1 and the second point CR2 with a line and extending obliquely is denoted as an axis B (second line). An angle between the axis A and the axis B is denoted as an eccentric angle X. By the eccentric angle X, the eccentricity of the container 10 can be quantitatively indicated. In the present embodiment, the eccentric angle X of the container 10 is equal to or greater than 7°, and is preferably equal to or greater than 10°. The eccentric angle X is not limited to the angle equal to or greater than 7°, and may be greater depending on a size of the inlet-outlet portion 11.

When bisecting the body portion 13 in the top and bottom direction, an upper portion is substantially trapezoidal, as seen from the front. When bisecting the body portion 13 in the top and bottom direction, a lower portion is substantially rectangular, as seen from the front. The upper portion of the body portion 13 connecting to an end portion 121 of the neck portion 12 on a major axis-side is curved so that a distance between the axis A and the body portion 13 gradually increases downward. The lower portion of the body portion 13 connecting to the end portion 121 of the neck portion 12 on the major axis-side extends in parallel to the axis A. As shown in FIG. 1A, the body portion 13 connecting to an end portion 122 of the neck portion 12 on a minor axis-side extends in parallel to the axis A. As shown in FIG. 1A and FIG. 1B, the top plane of the inlet-outlet portion 11 and the bottom surface of the bottom portion 14 are parallel to each other.

Figure 2:
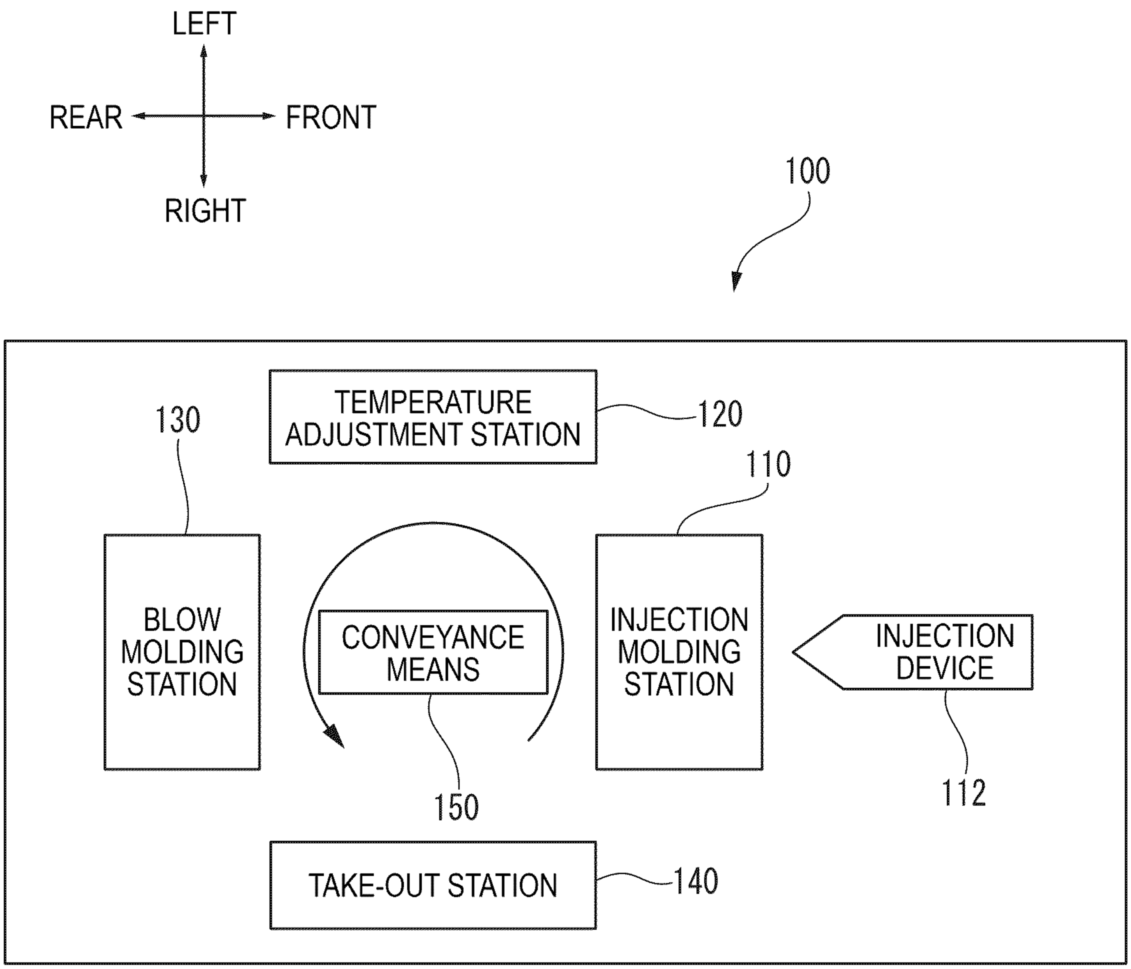
FIG. 2 is a functional block diagram of a blow molding apparatus.

Subsequently, a blow molding apparatus 100 for manufacturing a container is described with reference to FIG. 2. FIG. 2 is a block diagram of the blow molding apparatus 100.

As shown in FIG. 2, the blow molding apparatus 100 includes an injection molding station 110 for manufacturing a preform 20, and a temperature adjustment station 120 for adjusting a temperature of the manufactured preform 20. The injection molding station 110 is connected to an injection device 112 configured to supply a resin material that is a raw material. The blow molding apparatus 100 also includes a blow molding station 130 for blowing the preform 20 to manufacture the container 10, and a take-out station 140 for taking out the manufactured container 10.

The injection molding station 110, the temperature adjustment station 120, the blow molding station 130 and the take-out station 140 are provided in positions rotated by predetermined angles (in the present embodiment, 90°) about conveyance means 150. The conveyance means 150 includes a rotation plate and the like, and is configured such that the preform 20 or the container 10 in a state where the neck portion 12; 22 is supported by neck molds 152 attached to the rotation plate is conveyed to each station as the rotation plate is rotated, as shown in FIGS. 4A, 4B and 6A to 6C, which will be described later.

The injection molding station 110 shown in FIG. 2 has an injection cavity mold, an injection core mold, a neck mold and the like, which are not shown. The resin material is caused to flow from the injection device 112 into a preform-shaped space formed as the molds are mold-clamped, so that a bottomed preform 20 is manufactured.

Figure 3A:
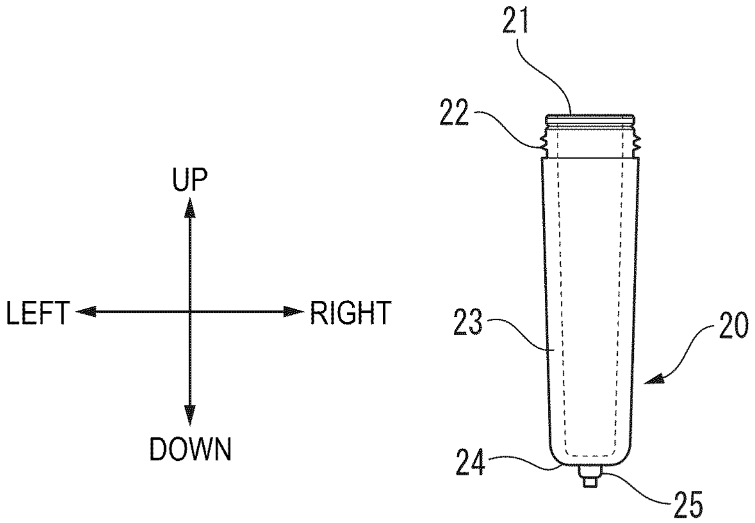
FIG. 3A is a front view of a preform, exemplifying an appearance of the preform.
Figure 3B:
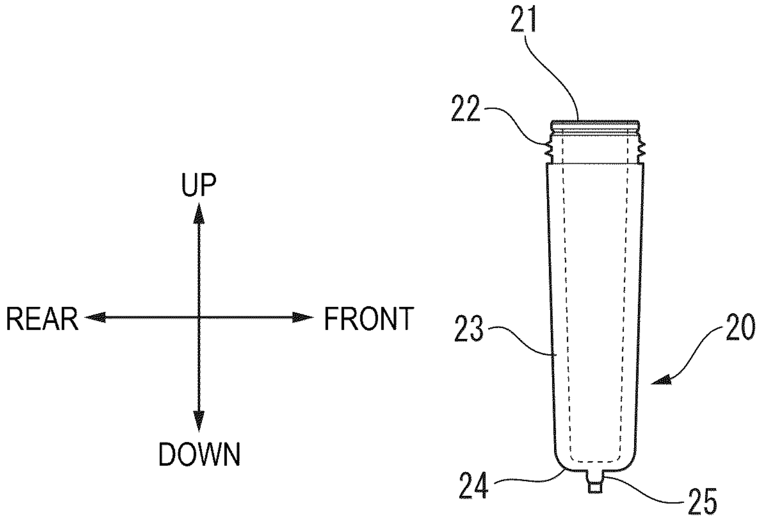
FIG. 3B is a right view of the preform, exemplifying the appearance of the preform.
Figure 3C:
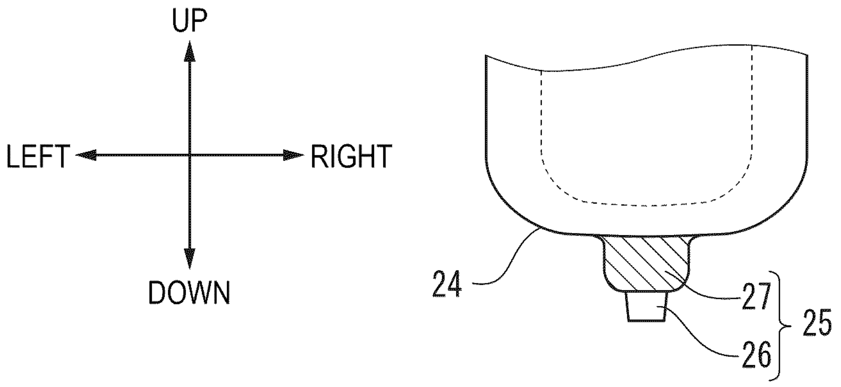
FIG. 3C is a partially enlarged view of the front view of the preform, exemplifying the appearance of the preform.
Figure 3D:
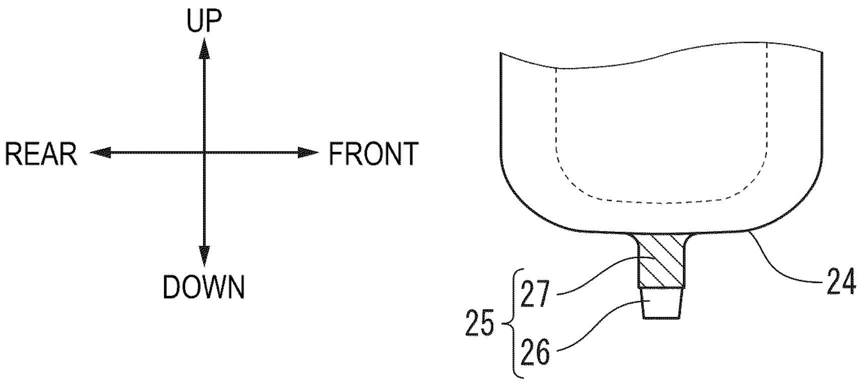
FIG. 3D is a partially enlarged view of the right view of the preform, exemplifying the appearance of the preform.

Here, the preform 20 of the present embodiment is described with reference to FIGS. 3A to 3D. FIG. 3A is a front view of the preform 20, FIG. 3B is a right view of the preform 20, FIG. 3C is a partially enlarged view of the front view of the preform 20, and FIG. 3D is a partially enlarged view of the right view of the preform 20. The preform 20 is configured by a neck portion 22 having an opening 21, a body portion 23 connected to the neck portion 22 and defining a sidewall portion of the preform 20, and a bottom portion 24 connected to the body portion 23. A central portion of the bottom portion 24 is provided with a bulge portion 25. The bulge portion 25 includes a gate portion 26 close to an injection gate for a resin during preform molding, and a protrusion 27 formed on a further upper side than the gate portion 26 in the vertical direction and connected to a lower end of the preform 20. The protrusion 27 has a flat shape, and a diameter is larger than (a width is larger) than the gate portion 26, as seen from the front (FIGS. 3A and 3C), and a width is equal to the gate portion 26, as seen from a lateral side (FIGS. 3B and 3D). Specifically, a length of the protrusion 27 in a right and left direction (a wide width direction in which the protrusion 27 is seen wider than the gate portion 26 in a state where the preform 20 is supported by the neck molds 152) is longer than a length of the gate portion 26 in the right and left direction. A length of the protrusion 27 in a front and rear direction (a direction in which a width of the protrusion 27 is seen equal to a width of the gate portion 26 in the state where the preform 20 is supported by the neck molds 152) is equal to a length of the gate portion 26 in the front and rear direction.

Returning to FIG. 2, the blow molding apparatus 100 is described. The temperature adjustment station 120 is configured to adjust a temperature of the preform 20 manufactured in the injection molding station 110 to a temperature suitable for final blow. The blow molding station 130 is configured to perform blow molding on the preform 20 whose temperature has been adjusted by the temperature adjustment station 120, thereby manufacturing the resin-made container 10. The blow molding station 130 includes a mold 200 for blow molding (refer to FIG. 4A) and a stretch mechanism (not shown). The stretch mechanism includes a stretch rod 132 (refer to FIG. 4A) and a blow nozzle (not shown).

Figure 4A:
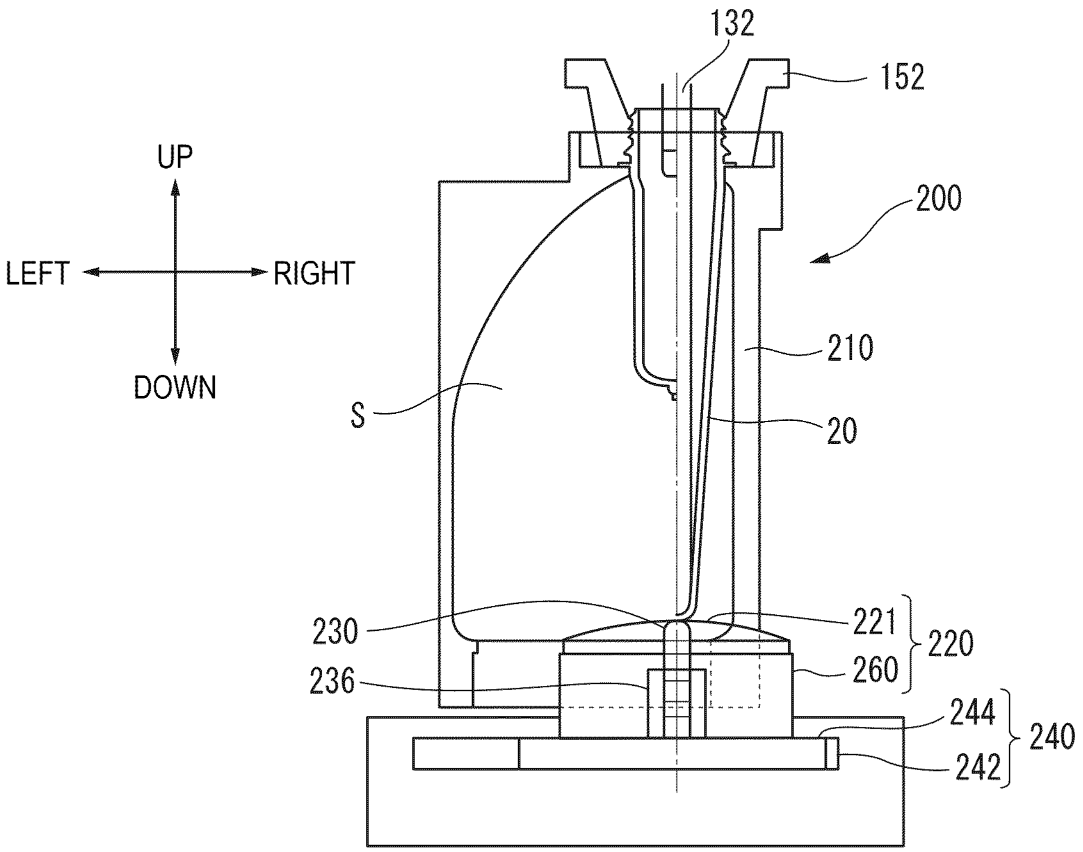
FIG. 4A is a front view of a mold for blow molding.
Figure 4B:
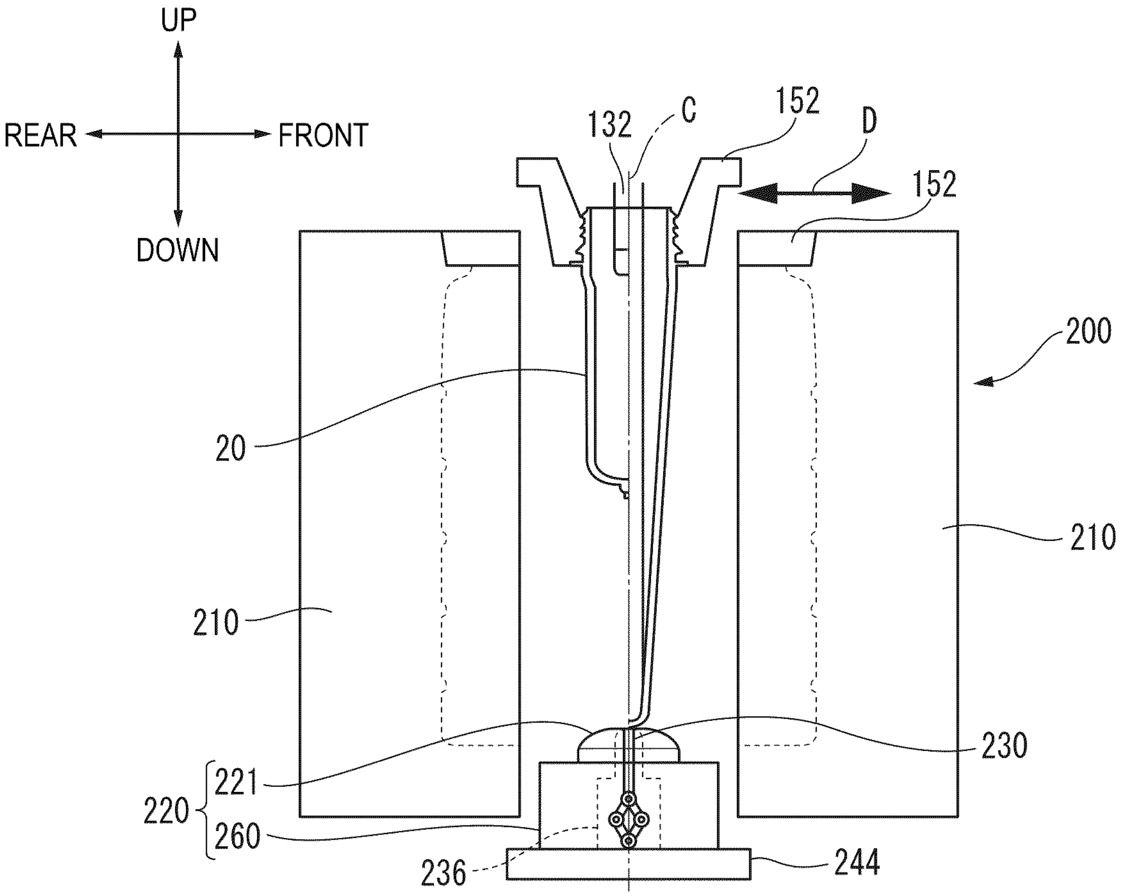
FIG. 4B is a right view of the mold for blow molding.

Here, the mold 200 for blow molding of the blow molding station 130 is described in detail with reference to FIGS. 4A and 4B. FIG. 4A is a front view of the mold 200, and FIG. 4B is a right side view of the mold 200. The mold 200 has a pair of split molds (blow cavity split molds) 210, a bottom mold 220, a pair of neck molds 152, a clamping mechanism 230, and a moving mechanism 240.

The split molds 210 are configured to open and close in the front and rear direction (opening and closing direction D), based on parting surfaces C, as seen from a side (FIG. 4B). As shown in FIG. 4A, the pair of split molds 210 forms a space S for defining the body portion 13 of the container 10, in a closed state.

The bottom mold 220 includes a first bottom mold member 221 configured to define the bottom portion 14 of the container 10, and a second bottom mold member (accommodation block) 260 arranged below the first bottom mold member. The bottom mold 220 is also provided with the clamping mechanism 230 so as to be accommodated therein (FIGS. 4A and 4B). In the first bottom mold member 221, at least a part of a clamping portion 232 (which will be described later) of the clamping mechanism 230 is accommodated. In the second bottom mold member 260, at least a part of an opening and closing mechanism 234 (which will be described later) of the clamping mechanism 230 is accommodated. The second bottom mold member 260 is provided on an upper surface of a guided part 244, which will be described later. The bottom mold 220 and the guided part 244 are integrally movable in the right and left direction (a direction in which the second bottom mold member 260 is advanced or retreated).

Figure 5:
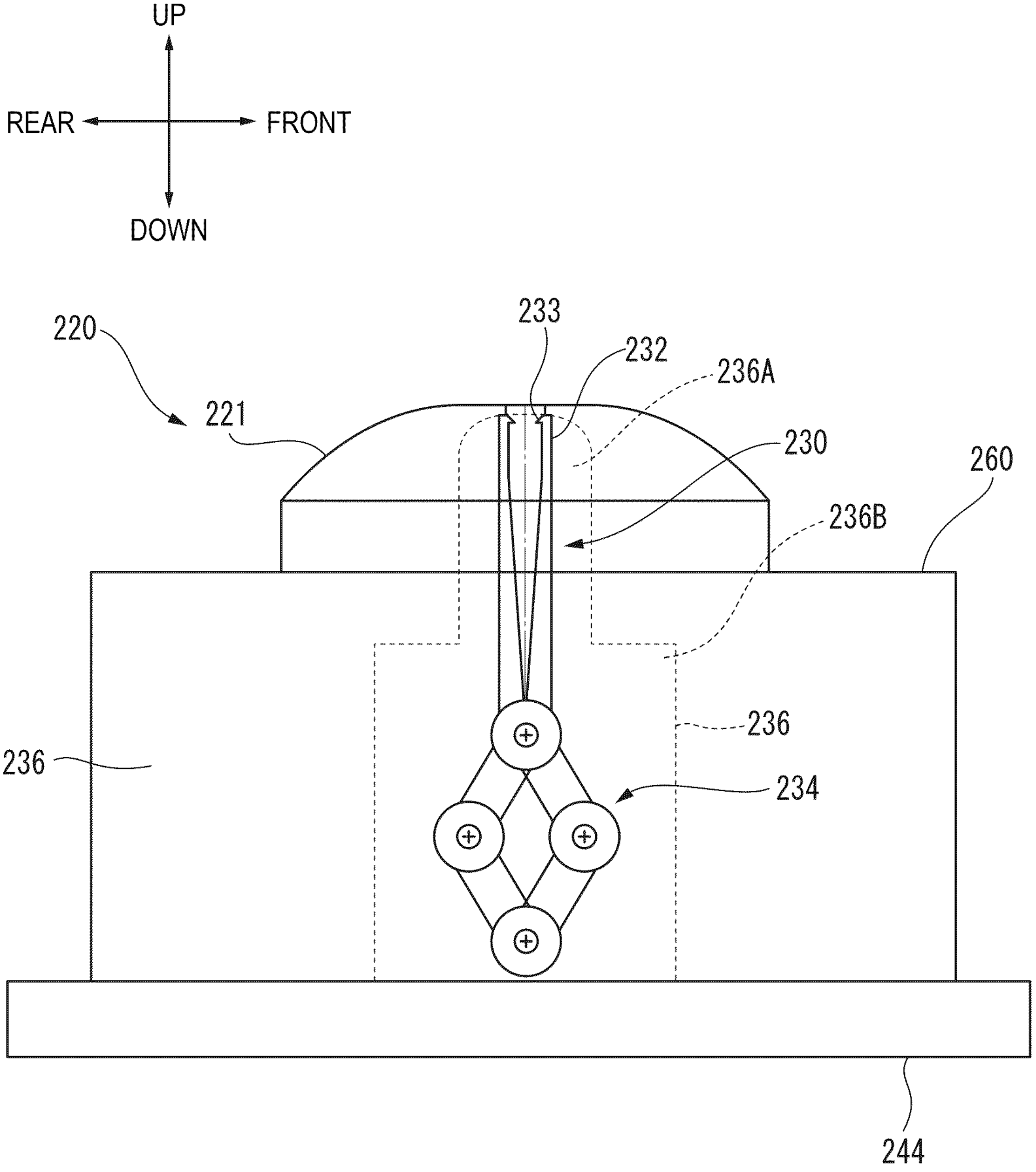
FIG. 5 exemplifies a clamping mechanism.

Here, the clamping mechanism 230 is described with reference to FIG. 5. The clamping mechanism 230 includes a clamping portion 232 capable of clamping the protrusion 27 of the bulge portion 25 provided in the bottom portion 24 of the preform 20. The clamping portion 232 is provided independently of the bottom mold 220 (separately provided without being directly provided in the bottom mold 220). The clamping portion 232 is openable and closable by an opening and closing mechanism 234 including a link mechanism below the bottom mold 220, and clamps the protrusion 27 by shifting from an opened state to a closed state. A tip end of the clamping portion 232 is provided with a claw portion 233 protruding inward from the clamping portion 232, and the claw portion 233 is configured to bite the protrusion 27 in a state where the clamping portion 232 is closed.

The first bottom mold member 221 includes a first accommodation portion 236A. The second bottom mold member 260 includes a second accommodation portion 236B. As used herein, a portion configured by the first accommodation portion 236A and the second accommodation portion 236B is defined as an accommodation portion 236. Note that, the first accommodation portion 236A and the second accommodation portion 236B communicates with each other. The accommodation block 260 and the bottom mold 220 are each provided with an opening for guiding the bulge portion 25 of the preform 20 to the clamping portion 232. The clamping portion 232 and the opening and closing mechanism 234 are covered with the accommodation portion 236. In the accommodation portion 236, the clamping mechanism 230 is arranged.

Returning to FIGS. 4A and 4B, the mold 200 is described. As described above, the neck molds 152 are configured to convey the preform 20 or the container 10 to each station as the rotation plate is rotated, in a state where the neck molds 152 are attached to the rotation plate and support the neck portion 12, 22. The moving mechanism 240 has a guide groove 242 arranged below the bottom mold 220 and having a flat shape, and a guided part 244 connected to a moving block (not shown) fixed immediately below the accommodation portion 236 (FIG. 4A). The guide groove 242 is configured to draw a line extending in parallel to the top plane of the inlet-outlet portion 11 of the preform 20.

The moving mechanism 240 can move the bottom mold 220 via the moving block in parallel to the top plane of the inlet-outlet portion 11 of the preform 20 in a stationary state held by the neck molds 152 by moving the guided part 244 along the guide groove 242.

Again back to FIG. 2, the take-out station 140 of the blow molding apparatus 100 is described. The take-out station 140 is configured to take out the container 10 by opening the neck portion 12 of the container 10 manufactured in the blow molding station 130 from the neck molds 152.

Figure 6A:
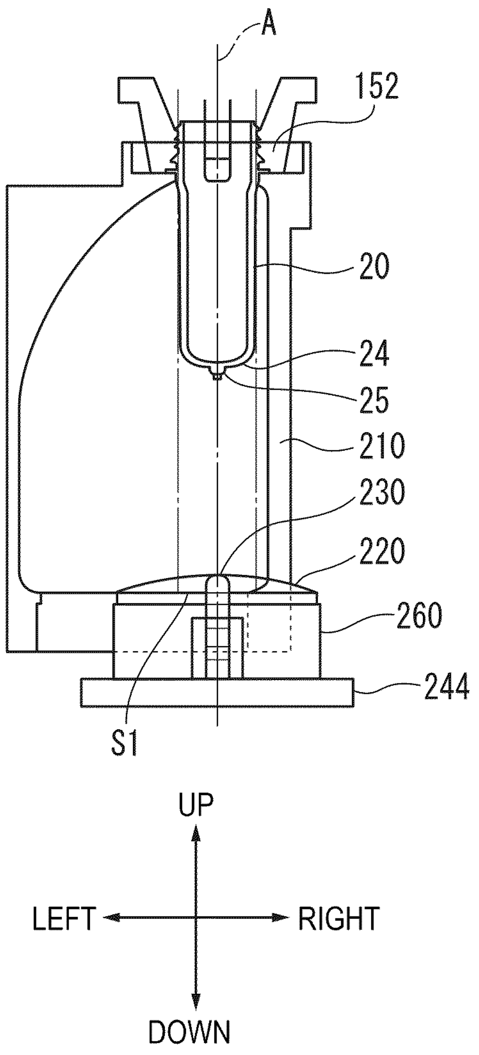
FIG. 6A shows an aspect of blow molding, exemplifying an aspect in which the preform is accommodated in the mold in a state where split molds are closed.
Figure 6B:
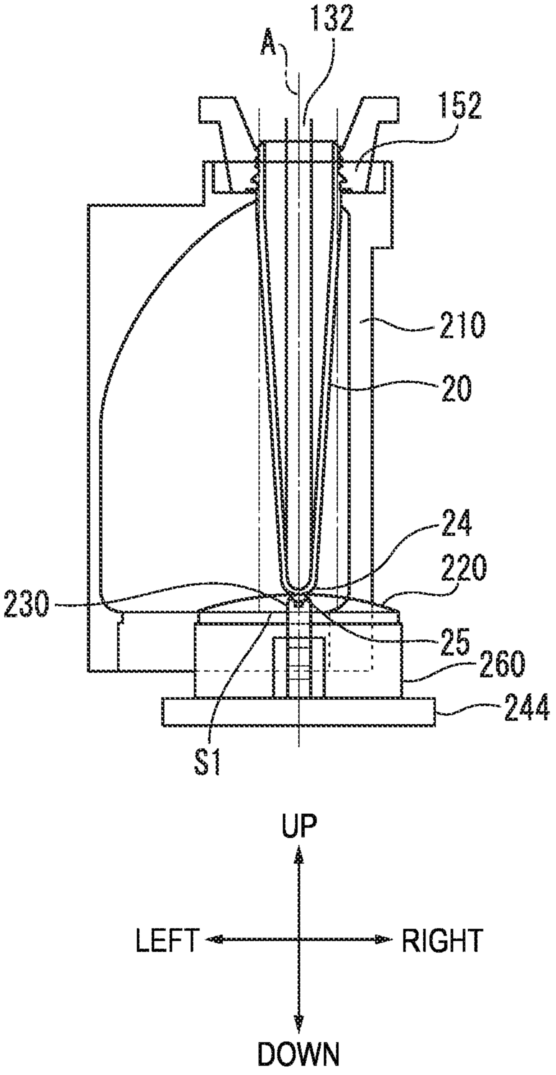
FIG. 6B shows an aspect of blow molding, exemplifying a state where a protrusion of the preform is clamped by the clamping mechanism.
Figure 6C:
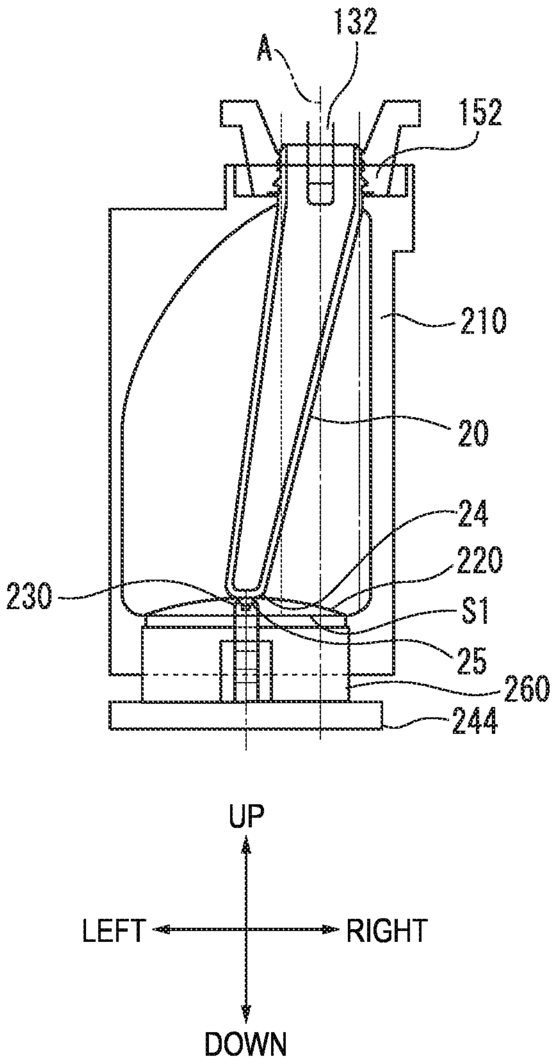
FIG. 6C shows an aspect of blow molding, exemplifying a state where the preform is bent.

Subsequently, a blow molding method of the container 10 in the blow molding station 130 of the blow molding apparatus 100 is described with reference to FIGS. 6A to 6C. FIG. 6A shows an aspect where the preform 20 is accommodated (conveyed) in the mold 200 in a state where the split molds 210 are opened, FIG. 6B shows a state where the protrusion 27 of the preform 20 is clamped by the clamping mechanism 230, and FIG. 6C shows a state where the preform 20 is bent. In the present embodiment, the blow molding process includes: a clamping process of clamping the protrusion 27 of the preform 20 accommodated in the mold 200 by the clamping mechanism 230 of the mold 200, in a state where the split molds 210 included in the mold 200 are opened; a bending process of bending the preform 20 by moving the protrusion 27 of the preform 20 to a position becoming the eccentric region S2 in a state where the neck portion 22 of the preform 20 is held by the neck molds 152; and a blow process of closing the split molds 210 to stretch the preform 20 by a pressurizing medium.

First, the preform 20 supported by the neck molds 152 and adjusted to a temperature suitable for blow molding in the temperature adjustment station 120 is conveyed to the blow molding station 130 by the conveyance means 150 and is accommodated in the mold 200 in a state where the split molds 210 are opened (FIG. 6A). Then, the stretch rod 132 provided in the blow molding station 130 and located in a standby position is moved down to press the bottom portion 24 of the preform 20 from an inside thereof, thereby stretching the preform 20 toward the bottom mold 220 (preliminary stretch process). The preform 20 is stretched to the bottom mold 220 to accommodate the bulge portion 25 of the bottom portion 24 in openings of the bottom mold 220 and the accommodation portion 236 (FIG. 6B). The protrusion 27 of the accommodated bulge portion 25 is clamped by the clamping mechanism 230, and the bottom mold 220 included in the mold 200 and the bottom portion 24 of the preform 20 are connected to each other (clamping process). Thereafter, the stretch rod 132 is moved up to the standby position.

Subsequently, the guided part 244 is moved leftward (a direction in which the accommodation block 260 is advanced) along the guide groove 242 (FIG. 4A) by the moving mechanism 240 (FIG. 4A). Thereby, the bottom mold 220 clamping the protrusion 27 can be moved leftward so as to be parallel to the top plane of the inlet-outlet portion 11 of the preform 20 in a stationary state held by the neck molds 152 (FIG. 6C). For this reason, the protrusion 27 is moved to the eccentric region S2 that is on an outer side of the projected region S1. As a result, the preform 20 is stretched and simultaneously bent from a start point immediately below the neck portion 22 such that the protrusion 27 is caused to be eccentric with respect to the axis A (bending process). At this time, a stretch amount of a body portion, which is at the left of the axis A, of the body portion of the preform 20 is smaller than a stretch amount of a body portion at the right of the axis A (a body portion wall of the preform in an opposite direction to the moving direction of the bottom mold 220 or the accommodation portion 236 is more stretched than a body portion wall on the same side as the moving direction). Then, the split molds 210 are closed to accommodate the bent preform 20 in the space S defining an outer shape of the container 10 configured by the neck molds 152, the split molds 210 and the bottom mold 220. In this state, the pressurizing medium such as air is introduced into the preform 20 to blow/stretch the preform 20, so that the container 10 is molded (blow process). After the molding, the split molds 210 are opened to open the container 10, and the container 10 is conveyed to the take-out station 140 by the conveyance means 150. By the above method, it is possible to form the container 10 having a large eccentricity from the preform 20 by blow molding.

Figure 7:
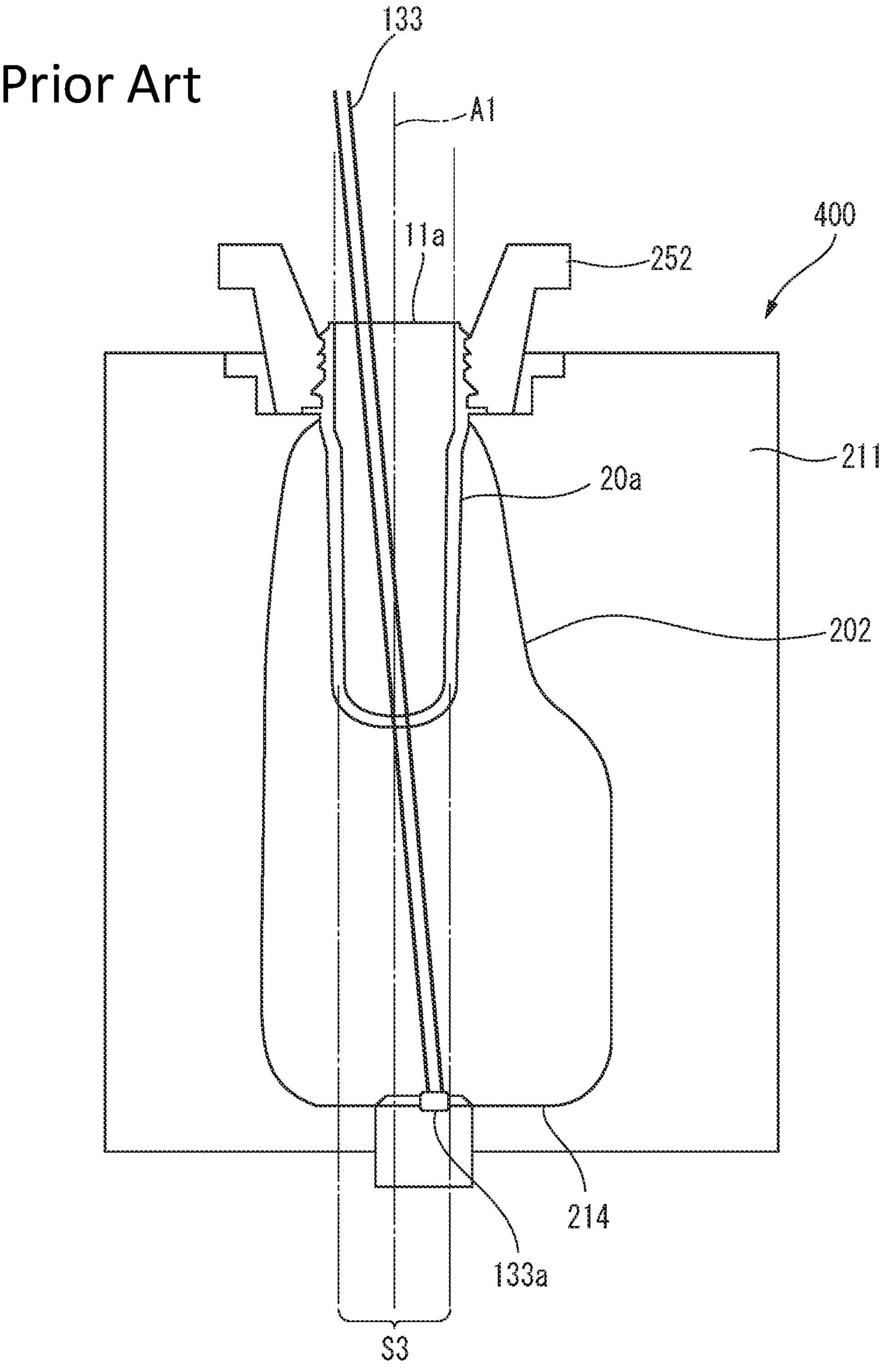
FIG. 7 Prior Art
FIG. 7 shows an example of a blow molding apparatus of the related art.

In the meantime, examples of the container that is manufactured by the blow molding method include an eccentric container (off-center bottle) in which a central axis of the neck portion is not coaxial. FIG. 7 shows an example of a blow molding apparatus 400 of the related art. As shown in FIG. 7, a stretch rod 133 is slightly inclined with respect to an axis A1 of a preform 20*a* and neck molds 252. Here, a region, in which a bottom portion 214 of an inner wall surface 202 of split molds 211 is demarcated by two parallel lines extending downward from a lower end, which is a base end, of an inner peripheral surface of an inlet-outlet portion 11*a* of the preform 20*a*, is denoted as a region S3. In the blow molding apparatus 400 of the related art, a lower end portion 133*a* of the stretch rod 133 is positioned in the region S3. The inner wall surface 202 of the split molds 211, which demarcates a shape of an eccentric container, is demarcated by the split molds 211. When the air is blown into the preform 20*a* through a blow hole, the preform 20*a* is formed into a shape corresponding to the inner wall surface 202 of the split molds 211 demarcating the shape of the eccentric container.

Examples of the eccentric container of the related art include a container (refer to PTL 2 and PTL 3) in which a gate portion is at a center of a bottom portion and is not immediately below a neck portion (inlet-outlet portion), and a container (refer to PTL 4) in which a gate portion is not at a center of a bottom portion and is immediately below a neck portion.

The container in which a gate portion is at a center of a bottom portion and is not immediately below a neck portion (inlet-outlet portion 11*a*) is manufactured by accommodating the preform 20*a* in a blow mold, moving down the stretch rod 133 in an inclined state in an oblique direction while bringing the same into contact with an inner wall surface of the bottom portion of the preform 20*a*, and bulging the preform with the blow air. For this reason, as the preform 20*a* of the container, a preform in which a thickness distribution of the body portion of the preform 20*a* is symmetrical or slightly asymmetrical (i.e., the thickness of the body portion of the preform is made slightly uneven) with respect to the right and left direction is used, for example. In addition, the preform 20*a* is usually designed to have an optimal thickness distribution or appearance shape for a container, taking into consideration a stretch amount, stiffness and the like of each portion corresponding to the container.

When manufacturing the container disclosed in PTL 2 or PTL 3, as shown in FIG. 7, the preform is biaxially stretched (blow and swell) while moving the gate portion of the preform 20*a* to a designed position on the bottom portion-side of the inner wall surface 202. Note that, in PTL 3, the preform 20*a* is forcibly bent to temporarily form a bent preform by slightly inclining (rotating) the stretch rod 133 during the preliminary stretch process, and then the preform is biaxially stretched by moving down the stretch rod in an oblique direction, so that off-center of the gate portion is prevented. In addition, as required, the gate portion of the preform is sandwiched and crushed between an upper surface of the bottom mold and a tip end portion of the stretch rod. The reason is that, if a stationary position of the gate portion with respect to the inner wall surface 202 deviates, an off-center state occurs and the preform cannot be stretched as designed. If the off-center state occurs, unfavorable phenomena that a position of the gate portion is formed in an irregular position of the bottom portion, each portion of the preform is stretched in a direction different from an expected direction, and the preform comes into contact with the blow cavity surface at an unexpected location, for example, occur. As a result, a container that is inferior in terms of physical properties such as stiffness and an aesthetic appearance may be manufactured. For this reason, in order to manufacture a high-quality container by the stretch blow molding method, it is necessary to arrange the stretch rod on an inner side of the preform during inclination stretching.

In a rotation plate-type blow molding machine, the stretch rod is accommodated (arranged) so as to be movable up and down in an inclined state in a blow core mold configured to move up and down by causing the air to flow. A tip end portion of the blow core mold is small because it is airtightly fitted to the neck portion of the preform. When molding a plurality of containers at the same time, a diameter of a cylindrical portion above the tip end portion of the blow core mold cannot be also made large. In addition, the diameter of the cylindrical portion above the tip end portion of the blow core mold cannot be made large, when considering a size of a tapered surface to fit with the neck mold, and the like.

Further, an outer peripheral wall of the blow core mold cannot be made very thin because it should have sufficient stiffness to receive a mold clamping force. The stretch rod cannot also be made very thin because it should have strength capable of bearing a reactive force from the preform during blow molding. Due to the structural reasons of the stretch mechanism, an inclination angle of the stretch rod is limited to a range of a hollow space having a limited small diameter in the blow core mold. As a result, in the related art, it is difficult to manufacture a container having a large eccentric angle by the stretch blow method.

As an example of the eccentric angle, for example, for a container in which an inner diameter of the inlet-outlet portion is about 36 mm and an outer diameter is about 40 mm, the eccentric angle is about 5°, and for a container in which an inner diameter of the inlet-outlet portion is about 46 mm and an outer diameter is about 50 mm, the eccentric angle is about 7°. For this reason, according to the stretch blow molding method disclosed in PTL 2 and PTL 3, only a container having a small eccentricity (eccentric angle X) can be manufactured.

In addition, the manufacturing method disclosed in PTL 4 is a manufacturing method of straightly stretching a preform whose thickness deviation is large by a stretch rod, and then largely bulging a lateral surface of a thick body portion of the preform by blow air. However, when a thickness deviation ratio (thickness eccentricity) of the preform is made large, a difference in flow velocity of resin during injection molding increases, so that an appearance defect such as a weld (a trace of attached melted resin) may be formed on the body portion. For this reason, in practice, it is difficult to increase the thickness deviation ratio. Further, according to the manufacturing method disclosed in PTL 4, it is very difficult to adjust the preform having a large thickness deviation before blow molding to a temperature suitable for blow. For this reason, when manufacturing a container, particularly, a container having a large stretching ratio by using the method, it is very difficult to stretch the preform, as designed. For this reason, even with the manufacturing method, it is not possible to increase the eccentricity (eccentric angle X) of the container to be manufactured so much.

In addition, the eccentric container is used for an engine oil container, a trigger type spray container, and the like, for example. A container having a relatively small eccentric angle can be manufactured by the stretch blow molding method by using an inclination stretch mechanism disclosed in PTLs 1 to 3 or a preform of PTL 4 whose thickness in a circumferential direction is changed. However, even when these means are used, for an eccentric container manufactured by the corresponding molding method, the eccentricity (eccentric angle X) is limited to about 7° so as to prevent a quality defect such as off-center. At this time, the bulge portion is positioned in a region (projected region) defined by an intersection point of a projection line (extension line) of an outer diameter of the neck portion and the bottom portion. Specifically, the bulge portion is positioned in the projected region from an inner diameter of the neck portion to the bottom portion. Therefore, in the related art, a container having a large eccentricity is manufactured by the extrusion blow molding method.

However, the container that can be manufactured by the extrusion blow molding method is generally inferior to the container manufactured by the stretch blow molding in terms of an aesthetic appearance. In addition, in the case of the container that can be manufactured by the extrusion blow molding method, there is a concern about poor welding (pinholes) at a pinch-off portion of the bottom portion. In the case of the container that can be manufactured by the extrusion blow molding method, dimensional accuracy of the neck portion for shaping the neck portion by air blow is not high. Specifically, airtightness of the container that can be manufactured by the extrusion blow molding method is not good, as compared to the container that can be manufactured by the stretch blow molding. In addition, in the case of the container that can be manufactured by the extrusion blow molding method, removing of burrs should be necessarily performed, and an amount of useless resin (loss material) is large. Further, in the case of the container that can be manufactured by the extrusion blow molding method, it is necessary to perform a post-process referred to as trimming after blow molding. According to the extrusion blow molding method, it is difficult to manufacture a container with high surface gloss. Therefore, there is an increasing desire to manufacture a container having a large eccentricity (eccentric angle X) by using the stretch blow molding method.

In order to solve and improve the above problems, the present disclosure adopts a method without the stretch rod, which is necessarily required during inclination stretching, and the preform 20 is held (clamped) and stretched from an outside of the bottom portion 24 during inclination stretching. Thereby, even when manufacturing a container having a large eccentric angle, it is possible to securely move and stop the gate portion 26 of the preform 20 to a designed position. As a result, it is possible to stretch each portion of the body portion of the preform 20, as designed. That is, by using the manufacturing method and the manufacturing apparatus of the present disclosure, it is possible to manufacture the container 10 having good physical properties (quality) in which the eccentric angle X is larger as the gate portion 26 deviates from the projected region S1.

The bottom portion 14 of the container 10 of the above embodiment is provided with the bulge portion 25 protruding vertically downward. The container 10 is largely eccentric to the extent that the bulge portion 25 is positioned in the eccentric region S2 that is out of the projected region S1. For this reason, the aesthetic appearance of the container 10 is good and the eccentricity is large.

Further, in the container 10 of the above embodiment, since the protrusion 27 is wider than the gate portion 26, the bulge portion 25 can be easily clamped by the clamping mechanism 230, which improves the manufacturing facilitation of the eccentric container.

Further, according to the manufacturing apparatus, the manufacturing method and the mold 200 for blow molding of the above embodiment, the container 10 in which the top plane of the inlet-outlet portion 11 of the neck portion 12 is parallel to the bottom surface of the bottom portion 14 is manufactured. For this reason, when the container 10 is placed on a table, for example, the liquid in the container 10 unlikely overflows, as compared to a container in which the top plane of the inlet-outlet portion 11 is inclined with respect to the bottom surface.

Further, the container 10 of the above embodiment is provided with the bulge portion 25 capable of being clamped by the clamping mechanism 230 included in the mold 200 provided in the blow molding station 130 of the blow molding apparatus 100 using the stretch blow molding method. For this reason, the bulge portion 25 can be easily clamped with the clamping mechanism 230, which improves the manufacturing facilitation of the eccentric container.

Further, according to the manufacturing apparatus, the manufacturing method and the mold 200 for blow molding of the above embodiment, after the protrusion 27 of the bottom portion 14 of the preform 20 is clamped by the clamping mechanism 230, the preform 20 is bent such that the protrusion 27 moves to the eccentric region S2. By stretch-blowing the preform 20 in a bent state, the container 10 having a large eccentricity is manufactured.

Further, according to the manufacturing method of the above embodiment, it is not necessary to take into consideration the problems in the extrusion blow molding, and it is possible to manufacture the container 10 having an excellent aesthetic appearance and a large eccentricity by using the stretch blow molding method.

Note that, the present disclosure is not limited to the embodiment and can be modified and improved as appropriate. In addition, the materials, shapes, dimensions, numerical values, forms, number, arrangement places and the like of the respective constitutional elements of the embodiment are arbitrary and are not particularly limited as long as the object of the present disclosure can be achieved.

In the above embodiment, the aspect of the container 10 having the eccentric angle X equal to or larger than 7° has been described. However, according to the mold 200 and the blow molding method of the present embodiment, even a container having an eccentric angle X equal to or larger than 10° C. an be manufactured by the stretch blow molding method. In addition, the operation of the moving mechanism 240 may also be an operation consisting of rotation and linear/multi-step obliquely upward movement as well as the horizontal movement.

In the above embodiment, the air has been exemplified as the pressurizing medium for blowing the preform 20. However, a gas medium other than the air may also be used, and a liquid medium such as water can also be used for pressurization.

In the above embodiment, the aspect of the container 10 having the bulge portion 25 has been described. However, the present disclosure is not limited thereto. For example, a container including a cut remaining portion, which is formed after cutting the bulge portion 25, instead of the bulge portion 25, may also be possible. The cut remaining portion is positioned in the eccentric region S2.

In the above embodiment, the blow molding apparatus 100 is a so-called four-station type apparatus in which the temperature adjustment station 120 is provided between the injection molding station 110 and the blow molding station 130. However, the present disclosure is not limited thereto. For example, the blow molding apparatus 100 may also be a so-called two-station type or three-station type apparatus in which the temperature adjustment station 120 is not provided.

The subject application is based on Japanese Patent Application No. 2018-238111 filed on Dec. 20, 2018, the contents of which are incorporated herein for reference.

The invention claimed is:

1. A resin-made container, comprising:
- a neck portion having an inlet-outlet portion for contents;
- a lateral surface portion connected to the neck portion; and
- a bottom portion disposed on an opposite side to the neck portion and connected to the lateral surface portion,
- wherein the bottom portion is formed with a bulge portion protruding vertically downward,
- wherein the bulge portion is positioned in an eccentric region of the bottom portion, the eccentric region being out of a region perpendicularly projected from an opening plane of the inlet-outlet portion of the neck portion,
- wherein a top plane of the inlet-outlet portion of the neck portion and a bottom surface of the bottom portion are parallel to each other,
- wherein the resin-made container is manufactured by a stretch blow molding method,
- wherein an angle between a first line and a second line is equal to or greater than 7°, the first line passing through a center of the opening plane and being orthogonal to a ground contact surface of the bottom portion, the second line connecting an intersection point of a vertical line passing through a center of the bulge portion and intersecting with the ground contact surface of the bottom portion and the center of the opening plane,
- wherein the bulge portion comprises:
  - a gate portion; and
  - a protrusion located above gate portion and provided independently of the gate portion, and
- wherein the protrusion is wider than the gate portion.

2. The resin-made container according to claim 1, wherein the bulge portion has a shape capable of being clamped by a clamping mechanism provided in a manufacturing apparatus.

* * * * *